March 17, 1953 H. M. FLEMING ET AL 2,631,779

COUNTER CONTROL MECHANISM

Filed March 31, 1950 3 Sheets-Sheet 1

INVENTORS
HOWARD M. FLEMING
AUSTIN A. OVERBURY
BY George V. Hall
ATTORNEY

March 17, 1953 H. M. FLEMING ET AL 2,631,779

COUNTER CONTROL MECHANISM

Filed March 31, 1950 3 Sheets-Sheet 2

INVENTORS
HOWARD M. FLEMING
AUSTIN A. OVERBURY
BY George V. Hall
ATTORNEY

March 17, 1953 H. M. FLEMING ET AL 2,631,779

COUNTER CONTROL MECHANISM

Filed March 31, 1950 3 Sheets-Sheet 3

INVENTORS
HOWARD M. FLEMING
AUSTIN A. OVERBURY
BY George V. Hall
ATTORNEY

Patented Mar. 17, 1953 2,631,779

UNITED STATES PATENT OFFICE 2,631,779

COUNTER CONTROL MECHANISM

Howard M. Fleming and Austin A. Overbury, West Orange, N. J., assignors to Monroe Calculating Machine Company, Orange, N. J., a corporation of Delaware Application March 31, 1950, Serial No. 153,182

11 Claims. (Cl. 235—79)

The invention relates to means for controlling the operation of register actuating mechanisms for calculating machines. More specifically, the invention relates to means for controlling the automatic adjustment of a change lever for the actuator of a multiplier quotient or counter register, and particularly to such means whereby the normally effective counter actuator is rendered inoperable to effect registration during certain calculations where registration is undesirable.

In certain calculating machine work, the calculation may comprise the registration of a product in the product-dividend or accumulator register, and the subsequent division of the product by a divisor set in the keyboard of the machine, i. e. $(a \times b \div c)$. Normally, the multiplier will be registered in the counter register during the multiplying operation. It will be obvious, therefore, that the counter register must be cleared before the subsequent division operation so that the quotient, which is the final result of the dual calculation, may be correctly registered in the counter register.

As fully disclosed in the copending application, Serial No. 8,548, of Herman Gang which matured into Patent No. 2,531,207 on November 21, 1950, automatic means is operable, upon initiation of a program of division, to adjust a change lever for the counter actuator so that the sign of registration in the counter register will be unlike that in the accumulator. Upon conclusion of the program of division, the change lever is automatically restored to its normal setting in which the counter actuator is adjusted to effect like sign of registration. In the performance of a program of multiplication, no automatic adjustment of the change lever is effected as its normal setting controls the counter actuator for the proper sign registration. Also, the change lever may be manually adjusted to either of its sign controlling positions so that, for example, complemental registration may be effected in the counter register when desired.

According to this invention, as disclosed, the counter actuator is provided with an intermediate ineffective or neutral position in addition to its two other direction controlling positions for the reversing or direction controlling means. The reversing means is positioned in its neutral setting by adjusting the change lever to a position intermediate its two direction controlling positions. When in neutral position, the reversing means renders the counter actuator inoperable to effect registration in the counter register. A manipulatable control device including adjustable constraining means may be operated to adjust the change lever to its intermediate position in which no registration will be effected in the counter register during a program of multiplication following the adjustment. Upon initiation of a subsequent program of division, however, automatic means will operate to adjust the change lever from its neutral position to its unlike sign controlling position and therefore the correct quotient will be registered in the counter register. Upon termination of the program of division, the automatic adjusting means will be ineffective to restore the change lever from unlike to like controlling position, as the constraining means will arrest said change lever in its intermediate or neutral position. Thus, a series of combined multiplying and dividing operations may be effected without clearing the counter register between the individual operations comprising each combined calculation. The manipulatable control device may then be operated to adjust the change lever to its normal like sign controlling position, at which time the constraining means will be adjusted to ineffective position and the automatic control means will thereupon be normally operable to adjust the change lever to its respective sign controlling positions.

The invention, however, will best be understood from the following description when read in connection with the accompanying drawings in which.

Figures 2, 3, 4:
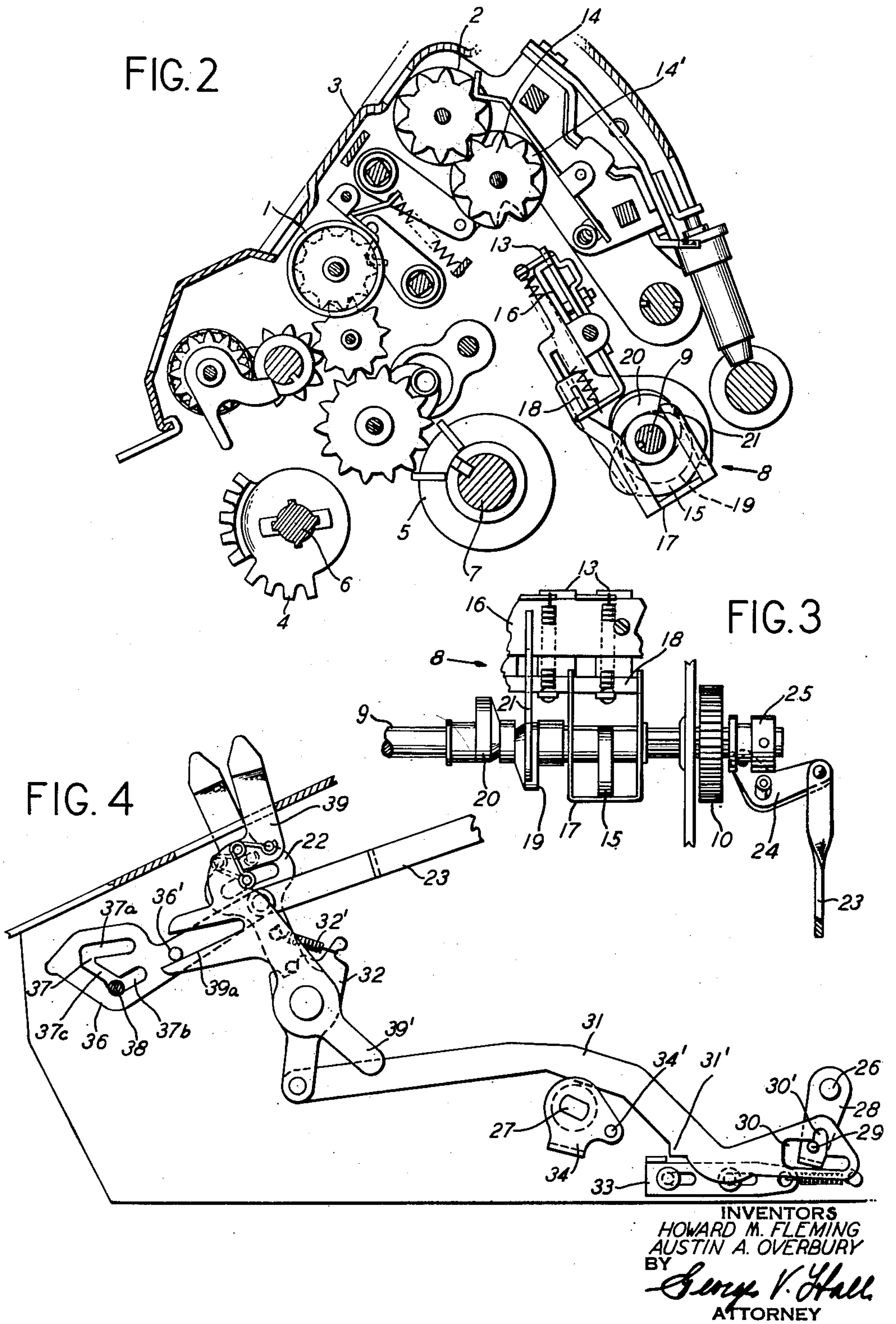
Fig. 2 is a fragmentary vertical section showing the accumulator and counter register wheels, and the actuating mechanisms therefor.
Fig. 3 is a fragmentary elevation showing the direction controlling drive means of the counter actuator.
Figure 5:
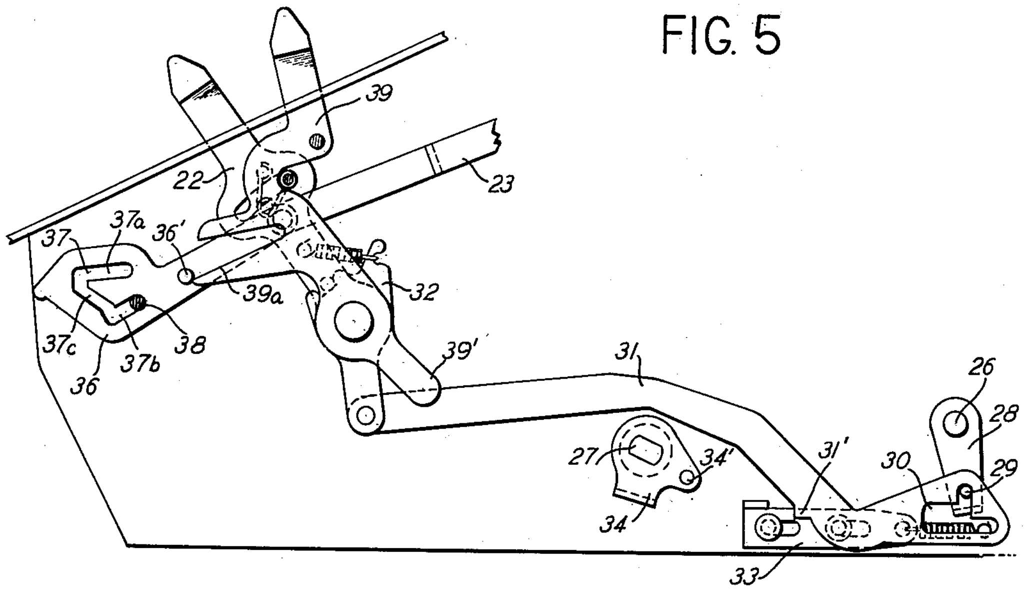
Figure 6:
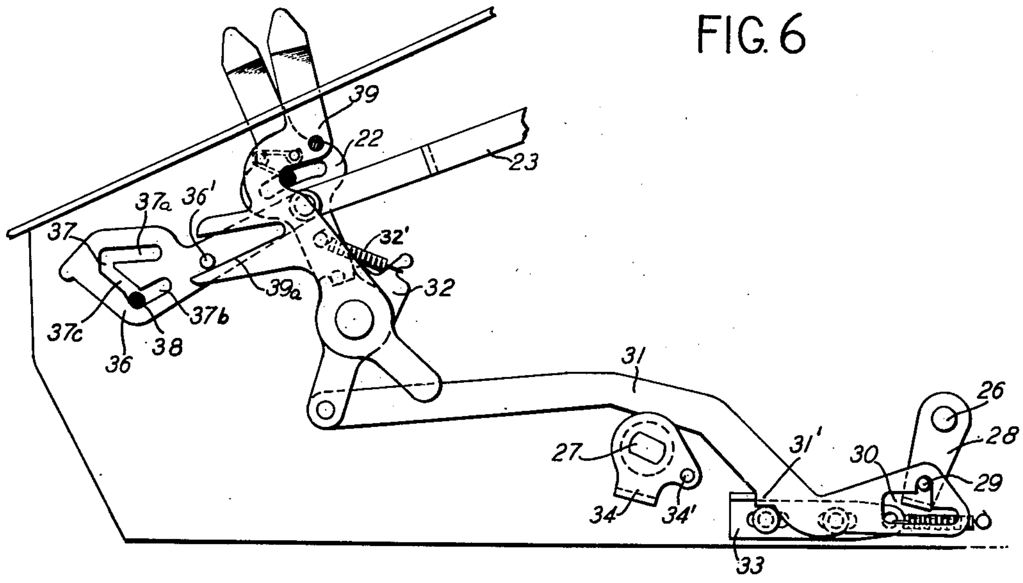

Figs. 4, 5, and 6 are side elevational views showing the devices of the invention in their several adjusted and operated positions.

*Registering mechanism*

The registering mechanisms for the accumulator register comprising numeral wheels 1 (Fig. 2) and for the counter register comprising numeral wheels 2 are constructed and operate substantially in accordance with the aforenoted disclosure of Patent No. 2,531,207, to which reference is made for the constructional and operational details.

Figure 1:
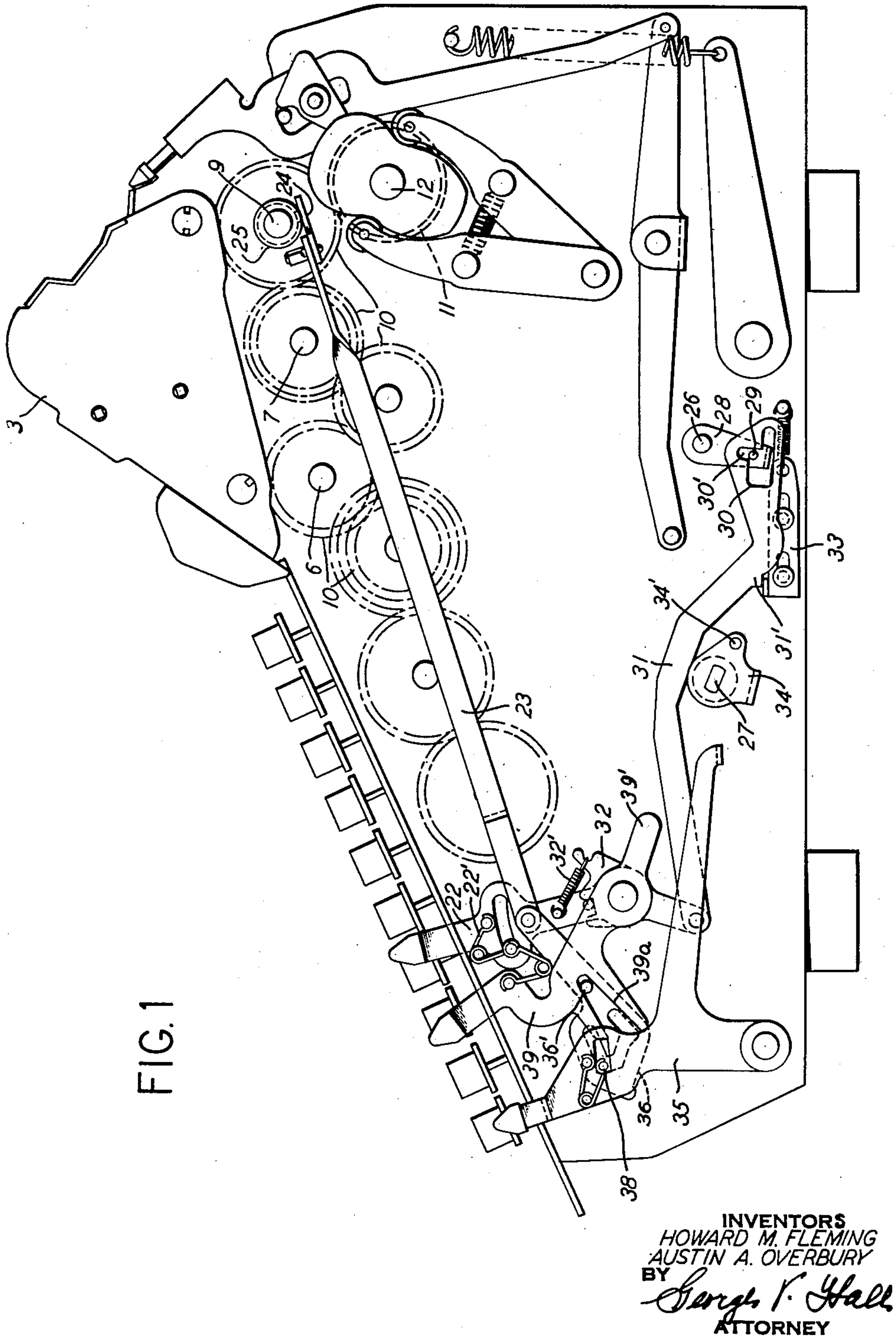
Fig. 1 is a right side elevation of a calculating machine embodying the invention and showing the devices thereof in normal position.

Accumulator wheels 1 and counter wheels 2 are mounted in a denominationally shiftable carriage 3 (Figs. 1 and 2). The actuating mechanism for accumulator wheels 1 comprises the differentially settable actuators 4 and tens transfer actuators 5 mounted in and driven by transversely extending shafts 6 and 7 respectively in the body of the machine. The counter actuator, designated generally by the numeral 8 (Figs. 2 and 3), is also mounted in the body of the machine and is driven by a shaft 9. Actuator shafts 6, 7, and 9 are driven at a one to one ratio by a gear train 10 (Fig. 1) from a drive gear 11 on shaft 12. Shaft 12 is driven forwardly or reversely by a reversible clutch mechanism (not shown) constructed and operated substantially in accordance with the disclosure of Patent 1,566,650, issued to George C. Chase on December 22, 1925, and the aforenoted copending application.

Drive means for the counter actuator 8 includes reversing means which is adjustable into either of two direction controlling positions so that the counter actuator 8 may be operated in the same or the reverse direction with relation to differential and tens transfer actuators 4 and 5 of the accumulator register. The counter actuator 8, including the reversing means, is constructed and operates substantially in accordance with the disclosure of U. S. Patent 2,273,237 of Edward C. Walter issued on February 17, 1942, and the aforenoted copending application. However, the reversing means as heretofore noted is modified in structure to provide for an intermediate or neutral setting whereby the actuator is rendered ineffective.

Actuator 8 comprises a series of counting fingers 13 (Figs. 2 and 3) which are slidably mounted for vertical movement in a transverse and pivotally mounted frame 16. Fingers 13 are spring urged upwardly but are normally held in lowered position by a cam 15 fixed on shaft 9 and engaging a plate 17 having connection with a cross bar 18 which engages the bent over lower ends of said fingers. Upon rotation of shaft 9 in either direction, cam 15 will release and then redepress plate 17. Therefore, fingers 13 will be raised and lowered under control of cam 15.

The reversing or direction controlling means for counter actuator 8 comprises a pair of spaced eccentrics 19 and 20 fixed on shaft 9. Eccentric 19 controls the operation to effect like sign registration, i. e., adding in the counter when adding in the accumulator, and eccentric 20 controls the operation to effect unlike sign registration. The eccentrics 19 and 20 are diametrically opposed on shaft 9 which is longitudinally slidable in the machine framing and splined to permit shifting with respect to its drive gear of train 10. Thus, shaft 9 may be adjusted to move one or the other of the eccentrics 19 or 20 into engagement with a fork 21 which is fixed to frame 16, or to an intermediate position, thereby locating eccentrics 19, 20 upon opposite sides and out of engagement with the fork. Eccentric 19 or 20 engaging fork 21 will reciprocally rock or swing frame 16 and fingers 13, in one or the reverse direction, thereby rotating the elements of the counter accordingly as said fingers are raised. That is, the rightmost finger 13 when raised will engage a tooth space of a related intermediate gear 14 and will effect a count of one in the related wheel 2, either like or unlike the registration being simultaneously made in accumulator wheels 1. Fingers 13 to the left of the rightmost finger 13 operate to effect tens transfers and are restrained from operation by disks 14′ secured to each intermediate gear 14 unless a tens transfer is indicated. Each disk 14′ is provided with a notch and when a tens carry is indicated, the notch of the lower order disk permits a finger 13 to move upwardly into engagement with a tooth space of the next higher order intermediate gear 14 to rotate the gear and effect the tens transfer.

When shaft 9 is adjusted to locate eccentrics 19, 20 in their neutral positions at opposite sides of fork 21, fingers 13 will be raised and lowered upon operation of cam 15 without a swinging reciprocatory motion and therefore no registration will be effected in counter wheels 2.

*The change lever*

A change lever 22 (Figs. 1, 4, 5, and 6) effects the adjustments of direction controlling eccentrics 19, 20, and is pivotally mounted outwardly of the right side frame toward the front of the machine. A link 23 (Figs. 1 and 3) connects lever 22 with one arm of a bell crank 24. The other arm of bell crank 24 has pin engagement with a concentric groove of a collar 25 which is fixed on the end of longitudinally adjustable shaft 9. When change lever 22 is adjusted to its rearward position (Fig. 1), bell crank 24 will be rocked counterclockwise (Fig. 3) thus moving shaft 9 to the left and eccentric 19 into engagement with fork 21 to control the operation of actuator 8 for like sign registration. Conversely, when change lever 22 is adjusted to its forward position (Fig. 5), eccentric 19 will be disengaged and eccentric 20 engaged for unlike sign registration. Change lever 22 is held in either of the two direction controlling positions by a toggle spring 22′ and is limited to its adjustments by a fixed pin engaging an arcuate slot in said lever. As hereinbefore noted, change lever 22 is normally adjusted to its like sign controlling position (Fig. 1) unless manually adjusted otherwise as hereinafter described.

*Automatic adjustment of change lever*

Upon initiation of a program of division, a shaft 26 is automatically rocked counterclockwise from the position shown in Fig. 1 to the position shown in Fig. 5 to effect certain adjustments controlling the program. Upon conclusion of the program shaft 26 is rocked clockwise to normal. Furthermore, upon conclusion of the division program, a shaft 27 (Figs. 1, 4, 5, and 6) is automatically rocked counterclockwise and return, thereby furnishing the drive means for a keyboard clearing operation. Power means and the control thereof for rocking shafts 26 and 27 is fully disclosed in the aforenoted copending application 8,548 and in the drawings of said copending application wherein shafts 616 and 484 correspond to shafts 26 and 27 respectively of the present disclosure. The counterclockwise movement of shaft 26 upon initiation of a program of division is utilized to adjust automatically change lever 22 to its unlike sign controlling position and the clockwise movement of the shaft at the conclusion of the program operates to restore automatically change lever 22 to its like sign controlling or normal position. Shaft 27 operates to adjust a coupling between shaft 26 and change lever 22 so that, when desired, manual adjustment of the change lever may be effected. The automatic adjustment of change lever 22 by shaft 26 is effected as follows:

Fixed on shaft 26 (Figs. 1, 4, 5, and 6) is a depending arm 28 having a pin 29 at its lower end. Pin 29 extends outwardly through a longitudinally disposed opening 30, in and adjacent the right end of a link 31. Link 31 extends toward the front of the machine and at its forward end is pivotally attached to a depending pivoted arm of a plate 32 which is copivotal with lever 22 and has a pin and slot connection thereto permitting limited relative movement between the plate and lever which movement is taken up in one direction by a yieldable spring connection 32'. A slot 30' (Figs. 1 and 4) extends upwardly from opening 30 intermediate its ends and the right end of the opening is reduced in width to form a depending shoulder defined by the top of the reduced portion of the opening and the right wall of the slot. A shoulder 31' formed on the lower edge of link 31 somewhat to the left of slot 30 rests upon a lug on the upper left edge of a slide 33 which is spring urged toward the rear of the machine. Thus, as shown in Fig. 1, the lug of slide 33 when engaging the shoulder 31' locates opening 30 of link 31 with its depending shoulder in the path of movement of pin 29 and the left upper edge of the opening in a plane above the pin. Therefore, upon counterclockwise movement of shaft 26 and arm 28, upon initiation of a division program, pin 29 will engage the depending shoulder of opening 30, move link 31 to the rear of the machine, and rock change lever 22 counterclockwise to its unlike controlling position through its pin and slot connection as shown in Fig. 5. When this adjustment of change lever 22 is made, shoulder 31' will be moved from and to the right of the lug of slide 33. In this position the right end of link 31 will be free to drop, thereby moving its slot 30' into engagement with pin 29 (Figs. 5 and 6).

When shaft 26 and arm 28 are restored clockwise upon termination of the division program, pin 29 engaging slot 30' will move link 31 toward the front of the machine thereby rocking change lever 22 clockwise to its normal like sign controlling position. Furthermore, as link 31 is moved forwardly, shoulder 31' will engage the lug of slide 33 and move the slide forwardly against the tension of its spring. This latter position of lug 31' and slide 33 is shown in Fig. 6, although the change lever 22 is not shown in its restored position as will hereinafter be described. As heretofore noted, shaft 27 will be rocked counterclockwise and return upon conclusion of the division program and this operation is timed to follow the operation of shaft 26. A collar 34 is fixed on the end of shaft 27, and at the end of a projecting arm integral with the collar a pin 34' extends inwardly below link 31. When shaft 27 is rocked, pin 34' will engage link 31 and move said link upwardly, thereby removing slot 30' from engagement with pin 29 and permitting slide 33 to be spring moved rearwardly to reposition its lug beneath the shoulder 31' of link 31 as shown in Fig. 1.

*Manual adjustment of change lever*

The slot and pin adjustable coupling 29, 30 of arm 28 with link 31 permits manual adjustment of change lever 22 to its direction controlling positions. The lug of slide 33 beneath shoulder 31' locates the upper edge of that portion of opening 30 to the left of slot 30' in link 31 in a plane slightly above pin 29 (Fig. 1). Therefore, if change lever 22 is manually rocked counterclockwise from its like sign controlling position shown in Fig. 1 to its unlike sign controlling position, the aforesaid upper edge of opening 30 will pass above and rest upon pin 29 as shoulder 31' of link 31 is moved to the right of the lug of slide 33. When change lever 22 is manually restored to like sign controlling position, shoulder 31' will pass above the lug of slide 33 before the upper edge of opening 30 is moved from engagement with pin 29. The parts are therefore maintained in position to permit either manual or automatic adjustment of the change lever.

Manual disabling means in the form of a lever 35 (Fig. 1) is provided to adjust link 31 to render the automatic means ineffective to adjust change lever 22. Lever 35 is pivoted at its lower end to the right side frame of the machine and a toggle spring holds the lever in either ineffective clockwise position (Fig. 1) or effective counterclockwise position. When lever 35 is moved to effective position, a lug at the end of a rightwardly extending arm of said lever will engage and raise link 31 to move the depending shoulder formed by opening 30 and the right edge of slot 30' above pin 29. Therefore, when arm 28 is rocked, pin 29 will move ineffectively in opening 30. Obviously, disablement of the automatic adjusting means will not interfere with the manual adjustment of change lever 22 as slot 30' is disengaged from pin 29.

As will hereinafter be apparent, should the provision for manual adjustment of change lever 22 and the disabling means for the automatic adjusting means be eliminated from the machine, the devices of the invention would operate equally well with a non-adjustable pivotal connection of link 31 with arm 28.

*Control of automatic adjustment of change lever*

The invention comprises a manipulable control device consisting of a unitary adjusting and constraining member and an operating member. The adjusting and constraining member comprises a plate 36 (Figs. 1, 4, 5 and 6) including a rearwardly extending arm which is pivotally mounted at its end to the point of connection of change lever 22 with link 23. A varidirectionally extending slot-like opening 37 in plate 36 includes a non-constraining portion 37*a*, a constraining portion 37*b*, an angularly disposed cam portion 37*c* connecting portions 37*a* and 37*b* at their front ends. A fixed pin 38 in the left side frame extends through opening 37, and plate 36 is normally adjusted in counterclockwise direction (Fig. 1) thereby bringing the junction of portions 37*a* and 37*c* of opening 37 into registration with pin 38. With the parts in this relative position, change lever 22 will be adjusted in its normal clockwise position as shown in Fig. 1. Non-constraining portion 37*a* of opening 37 is of such length that change lever 22 may be rocked counterclockwise to its unlike sign controlling position, thereby moving plate 36 and non-constraining opening 37*a* forwardly on pin 38. It will be apparent therefore that change lever 22 will be permitted its full range of movement and thus the automatic adjusting devices will be permitted their normal operation.

An operating member for manually adjusting control plate 36 comprises a lever 39 (Figs. 1, 4, 5, and 6) which has common pivotal mounting with change lever 22 to the outside thereof. Lever 39 is held in its normal counterclockwise position (Fig. 1) and in its operated clockwise position (Figs. 4, 5, and 6) by a toggle spring. Lever 39 is provided with a leftwardly extending cam slot 39a which has oppositely disposed cam faces for engaging a pin 36' on control plate 36. Upon movement of lever 39 to normal counterclockwise position, the cam slot 39a engaging pin 36' will move plate 36 to its ineffective constraining position wherein the automatic change lever adjusting means is permitted normal operation, as heretofore described.

When it is desired that no registration be effected in counting wheels 2 during a program of multiplication, lever 39 is manually adjusted to its clockwise position (Fig. 4) and the cam slot 39a thereof will move plate 36 clockwise to the position shown in Fig. 4. Furthermore, should lever 35 be in effective counterclockwise position, thereby disabling the automatic change lever adjusting means, a depending arm 39' of lever 39 will engage the rightwardly extending arm of lever 35, thus moving said lever past its dead center position so that its toggle spring may move it to ineffective position permitting link 31 to drop into position for operation by arm 28.

As hereinbefore noted, change lever 22 may be manually adjusted counterclockwise from its normal clockwise position. When lever 22 is in counterclockwise position, fixed pin 38 engaging the rear end of portion 37a of opening 37 will lock plate 36 against clockwise movement, and cam slot 39a engaging pin 36' will prevent clockwise movement of lever 39. The resistance of lever 39 to clockwise movement will, therefore, indicate to the operator that change lever 22 must be manually adjusted clockwise to normal before clockwise adjustment of lever 39 will be permitted.

Upon clockwise movement of plate 36, cam portion 37c will engage fixed pin 38 thereby moving plate 36 toward the front of the machine and rocking connected change lever 22 counterclockwise to an intermediate neutral position (Fig. 4). The counterclockwise movement afforded change lever 22 will position it a slight distance short of dead center and therefore its toggle spring will be ineffective to move it further in counterclockwise direction. With change lever 22 located in this intermediate position, direction controlling eccentrics 19 and 20 (Figs. 2 and 3) will be positioned at opposite sides respectively of fork 21 and therefore no registration will be effected in counting wheels 2 during a program of multiplication. With plate 36 moved clockwise to locate change lever 22 in its intermediate neutral position (Fig. 4), the junction of cam portion 37c and constraining portion 37b of opening 37 will be moved into registration with fixed pin 38. The forward end of constaining portion 37b engaging fixed pin 38 will prevent the movement of change lever 22 back to its like sign controlling position, but the portion 37b extends rearwardly a distance sufficient to permit lever 22 to be moved further counterclockwise from its intermediate to its unlike sign controlling position. Therefore, upon initiation of a program of division and the consequent operation of the automatic adjusting devices for change lever 22, said lever will be moved counterclockwise to its unlike sign controlling position as shown in Fig. 5.

Upon termination of the division program, it will be apparent that the automatic devices will be ineffective to restore change lever 22 to its normal clockwise position as the forward end of the constraining portion 37b of opening 37 by engagement with fixed pin 38 will arrest said lever in its intermediate position as shown in Fig. 6. However, full movement will be afforded adjusting arm 28 by the yield of spring 32' connecting plate 32 and change lever 22. Upon operation of shaft 27 in the subsequent automatic clearing operation, link 31 will be raised to move slot 30' from engagement with pin 29 and spring 32' will move plate 32 counterclockwise from the position shown in Fig. 6 into normal relation with change lever 22 as shown in Fig. 4. Upon manual adjustment of lever 39 to its normal counterclockwise position (Fig. 1), change lever 22 will be cammed to its normal like sign controlling position and the automatic change lever adjusting means will again be permitted normal operation.

Should a non-adjustable pivotal connection of link 31 with arm 28 be provided in lieu of pin and slot connection 29—30, change lever 22 could not be manually adjusted to unlike sign controlling position as the movement afforded by the yield of spring connection 32' is insufficient to permit the adjustment and furthermore spring 32' would restore the change lever upon release. Also the automatic adjusting means could not be disabled. However, connecting spring 32' would permit the movement of change lever 22 to its neutral position by the plate 36. It will be apparent therefore that the devices of the invention would operate equally well with a non-adjustable pivotal connection of link 31 and arm 28. Furthermore, the uncoupling operation of shaft 27 would be unnecessary with a non-adjustable connection.

From the foregoing it will be seen that successive combined multiplying and dividing operations may be effected with the correct quotients registered in counting wheels 2 without the necessity of clearing the wheels between the two parts of each operation.

Reference has been made in Patent No. 2,531,207 to power means operable in connection with a program of division in a particular type of calculating machine to effect the automatic setting of the change lever. It will be understood, however, that the devices of the invention are equally adaptable for use in other types of calculating machines wherein change lever adjustment is effected by automatically operable power means or wherein such power means is available.

Furthermore, it will be apparent that the invention is not necessarily restricted to use in connection with combined multiplication and division programs but that other applications of the invention wherein it is desired to control registering operations may appear to those skilled in the art. It will be understood therefore that the invention is not to be restricted except as required by the spirit of the appended claims.

I claim:

1. In a motor driven calculating machine having an accumulator register, a counter register, drive means for said counter register including reversing means adjustable into either of two direction controlling positions or into an intermediate ineffective position, and power means operable upon initiation and upon termination of a machine operation involving registrations in said accumulator register; the combination with a drive train connected to and operable by said power means upon initiation of said machine operation to adjust said reversing means to one of said controlling positions and upon termination of said machine operation to the other of said controlling positions, of a yieldable connection in said drive train, and a manually operable control device including a constraining member engageable to adjust said reversing means to its intermediate position and thereupon adjustable into position to arrest said reversing means in its intermediate position upon said terminal operation of said power means.

2. In a motor driven calculating machine having an accumulator register, a counter register, drive means for said counter register including reversing means adjustable into either of two direction controlling positions or into an intermediate ineffective position, and power means operable upon initiation and upon termination of a machine operation involving registrations in said accumulator register; the combination with a drive train connected to and operable by said power means upon initiation of said machine operation to adjust said reversing means to one of its controlling positions and upon termination of said machine operation to the other of said controlling positions, of a yieldable connection in said drive train, and a control device manually operable to engage and adjust said reversing means to its intermediate position and thereupon movable into position to arrest said reversing means in said intermediate position upon adjustment from said one of said controlling positions.

3. In a motor driven calculating machine having an accumulator register, a counter register, drive means for said counter register including reversing means adjustable into either of two direction controlling positions or into a neutral ineffective position, and power means operable upon initiation and upon termination of a machine operation involving registrations in said accumulator register; the combination with a drive train connected to and operable by said power means upon initiation of said machine operation to adjust said reversing means to one of its controlling positions and upon termination of said machine operation to its other controlling position, of a yieldable connection in said drive train, an adjustable constraining member engageable with said reversing means, and a manipulatable control device including connections with said reversing means and constraining member operable to adjust said reversing means to its neutral position and said constraining member into position to arrest said reversing means in said neutral position upon adjustment from said one controlling position, and operable to adjust said reversing means to said other controlling position and said constraining member to an ineffective position.

4. In a motor driven calculating machine having an accumulator register, a counter register, drive means for said counter register including reversing means adjustable into either of two direction controlling positions or into a neutral ineffective position, and power means operable upon initiation and upon termination of a machine operation involving registrations in said accumulator register; the combination with a drive train connected to and operable by said power means upon initiation of said machine operation to adjust said reversing means to one of its controlling positions and upon termination of said machine operation to its other controlling position, of a yieldable connection in said drive train, and a manipulatable control device including a unitary adjusting and constraining member engageable with and movable to adjust said reversing means to its neutral position and thereupon into position to arrest said reversing means in said neutral position upon adjustment from said one controlling position, and movable to adjust said reversing means to said other controlling position and thereupon into an ineffective constraining position.

5. In a motor driven calculating machine having an accumulator register, a counter register, drive means for said counter register including reversing means adjustable into either of two direction controlling positions or into a neutral ineffective position and power means operable upon initiation and upon termination of a machine operation involving registrations in said accumulator register; the combination with a drive train connected to and operable by said power means upon initiation of said machine operation to adjust said reversing means to one of its controlling positions and upon termination of said machine operation to its other controlling position, of a yieldable connection in said drive train, a manipulable control device including an adjustable unitary adjusting and constraining member having pivotal connection with said reversing means and a varidirectionally extending opening therein, and a fixed member engaging said opening; said constraining member being movable to adjust said reversing means to its neutral position and thereupon into position to arrest said reversing means in said neutral position on adjustment from said one controlling position, and movable to adjust said reversing means to said other controlling position and thereupon into an ineffective constraining position.

6. In a motor driven calculating machine having an accumulator register, a counter register, drive means for said counter register including reversing means adjustable into either of two direction controlling positions or into a neutral ineffective position and power means operable upon initiation and upon termination of a machine operation involving registrations in said accumulator register; the combination with a drive train connected to and operable by said power means on initiation of said machine operation to adjust said reversing means to one of its controlling positions and upon termination of said machine operation to its other controlling position, of a yieldable connection in said drive train, a manipulatable control device including an adjustable unitary adjusting and constraining member having pivotal connection with said reversing means and an opening therein comprising a non-constraining portion, a constraining portion and a cam portion connecting said two other portions, and a fixed member engaging said opening; said constraining member being movable to adjust said reversing member to its neutral position and thereupon the junction of the cam portion and constraining portion of said opening into registration with said fixed member whereby said reversing means is arrested in said neutral position upon adjustment from said one controlling position, and movable to adjust said reversing means into said other controlling position and thereupon the junction of said cam portion and said non-constraining portion of said opening into registration with said fixed member.

7. In a motor driven calculating machine having a product dividend register, differential actuators therefor, a multiplier quotient register, drive means including reversing means adjustable into either of two positions to control like or unlike direction of operation of said multiplier-quotient register with respect to said product dividend register or into a neutral ineffective position, and power means operable upon initiation and upon termination of a machine operation involving registrations in said product-dividend register; the combination with a drive train connected to and operable by said power means upon initiation of said machine operation to adjust said reversing means to said unlike controlling position and upon termination of said machine operation to said like controlling position, of a yieldable connection in said drive train, an adjustable constraining member engageable with said reversing means, and a manipulable control device including connections with said reversing means and constraining member operable to adjust said reversing means to its neutral position and said constraining member into position to engage and arrest said reversing means in said neutral position upon adjustment from said unlike controlling position, and operable to adjust said reversing means to its like controlling position and said constraining member to an ineffective position.

8. In a motor driven calculating machine having a product dividend register, differential actuators therefor, a multiplier quotient register, drive means including reversing means adjustable into either of two positions to control like or unlike direction of operation of said multiplier-qutient register with respect to said product dividend register or into a neutral ineffective position, and power means operable upon initiation and upon termination of a machine operation involving registrations in said product-dividend register; the combination with a drive train connected to and operable by said power means upon initiation of said machine operation to adjust said reversing means to said unlike controlling position and upon termination of said machine operation to said like controlling position, of a yieldable connection in said drive train, a manipulable control device including a unitary adjusting and constraining member engageable with and movable to adjust said reversing means to its neutral position and thereupon into position to arrest said reversing means in said neutral position upon adjustment from said unlike controlling position, and movable to adjust said reversing means to said like controlling position and thereupon into an ineffective constraining position.

9. In a motor driven calculating machine having an accumulator register, differential actuators therefor, a counter register, a counter actuator, a reversible drive transmission common to said differential and counter actuators, direction control means adjustable into either of two positions to control like or unlike direction of operation of said counter actuator with respect to said differential actuators or into a neutral ineffective position, and power means operable upon initiation and upon termination of a machine operation involving operation of said differential actuators; the combination with a drive train connected to and operable by said power means, upon initiation of said machine operation to adjust said direction controlling means to unlike controlling position and upon termination of said machine operation to said like controlling position, of a yieldable connection in said drive train, an adjustable constraining member engageable with said direction control means, and a manipulable control device including connections with said direction control means and constraining member operable to adjust said direction control means to its neutral position and said contraining means into position to arrest said direction control means in said neutral position upon adjustment from said unlike controlling position, and operable to adjust said direction control means to said like controlling position and said constraining member to an ineffective position.

10. In a motor driven calculating machine having an accumulator register, a counter register, drive means for said counter register including reversing means adjustable into either of two direction controlling positions or into an intermediate ineffective position, and power means operable upon initiation and upon termination of a machine operation involving registrations in said accumulator register; the combination with a manually operable change lever connected to said reversing means for adjusting said reversing means, and a drive train connected to said change lever including a coupling automatically adjustable by said power means to render said power means effective upon initiation of said machine operation to adjust said reversing means to one and upon termination of said machine operation to the other of said controlling positions, of a yieldable connection in said drive train, and a control device engageable with and manually operable in conjunction with said change lever to adjust said reversing means to its intermediate position and thereupon effective to arrest said reversing means in said intermediate position upon adjustment from said one of said controlling positions.

11. In a motor driven calculating machine having an accumulator register, a counter register, drive means for said counter register including reversing means adjustable into either of two direction controlling positions or into an intermediate ineffective position, and power means operable upon initiation and upon termination of a machine operation involving registrations in said accumulator register; the combination with a drive train connected to and operable by said power means upon initiation of said machine operation to adjust said reversing means to one and upon termination of said machine operation to the other of said controlling positions, and a coupling in said drive train adjustable to render the operation of said power means effective or ineffective, of a yieldable connection in said drive train, and a control device engageable with and manually operable to adjust said coupling to effective position and engageable to adjust said reversing means to its intermediate position and thereupon movable into position to arrest said reversing means in said intermediate position upon adjustment from said one of said controlling positions.

HOWARD M. FLEMING.
AUSTIN A. OVERBURY.

REFERENCES CITED

The following references are of record in the file of this patent:

UNITED STATES PATENTS

| Number | Name | Date |
|---|---|---|
| 2,160,361 | Hilder | May 30, 1939 |
| 2,393,018 | Boyden | Jan. 15, 1946 |
| 2,393,019 | Avery | Jan. 15, 1946 |
| 2,483,459 | Grip | Oct. 4, 1949 |

FOREIGN PATENTS

| Number | Country | Date |
|---|---|---|
| 681,954 | Germany | Oct. 7, 1939 |